(12) United States Patent
Hussain et al.

(10) Patent No.: US 9,587,856 B2
(45) Date of Patent: Mar. 7, 2017

(54) METHODS, APPARATUS AND ARTICLES OF MANUFACTURES TO DETECT IMPURITY DEPOSITS IN FLOW-THROUGH WATER HEATERS

(71) Applicant: Whirlpool Corporation, Benton Harbor, MI (US)

(72) Inventors: Saadat Hussain, Houston, TX (US); Alvaro Vallejo Noriega, Saint Joseph, MI (US); Rodney M. Welch, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 270 days.

(21) Appl. No.: 14/274,801

(22) Filed: May 12, 2014

(65) Prior Publication Data

US 2014/0369672 A1   Dec. 18, 2014

Related U.S. Application Data

(60) Provisional application No. 61/834,907, filed on Jun. 14, 2013.

(51) Int. Cl.
*H05B 3/42* (2006.01)
*F24H 1/12* (2006.01)
(Continued)

(52) U.S. Cl.
CPC ...... *F24H 9/2028* (2013.01); *A47J 27/21166* (2013.01); *A47J 31/545* (2013.01);
(Continued)

(58) Field of Classification Search
None
See application file for complete search history.

(56) References Cited

U.S. PATENT DOCUMENTS

| 4,138,878 A | * | 2/1979 | Holmes | G01N 25/18 |
|---|---|---|---|---|
| | | | | 374/43 |
| 5,360,549 A | * | 11/1994 | Mouche | G01N 33/18 |
| | | | | 210/101 |

(Continued)

FOREIGN PATENT DOCUMENTS

| CH | EP 1166698 A1 * | 1/2002 | ............. A47J 27/62 |
|---|---|---|---|
| DE | 102006042902 A1 | 3/2008 | |

(Continued)

OTHER PUBLICATIONS

EP 1166698A1, Werner et al, "Boiler for Steam Generator," Jan. 2, 2002, partial translation.*

(Continued)

*Primary Examiner* — Joseph M Pelham

(57) ABSTRACT

Example methods, apparatus and articles of manufacture to detect impurities in flow-through water heaters are disclosed. An example apparatus includes a flow-through water heater having a conduit to conduct a fluid flowing therethrough, a heating element extending around at least a portion of the conduit, and first and second temperature measuring elements to determine respective first and second temperatures at different locations on the conduit; and a computing unit to at least detect an impurity deposit in the conduit based on a difference between the first and second temperatures.

20 Claims, 7 Drawing Sheets

(51) Int. Cl.
- F24H 9/20 (2006.01)
- D06F 39/04 (2006.01)
- A47J 31/54 (2006.01)
- A47J 27/21 (2006.01)
- H05B 1/02 (2006.01)
- H05B 3/58 (2006.01)
- H05B 6/64 (2006.01)

(52) U.S. Cl.
CPC ............ *D06F 39/04* (2013.01); *D06F 39/045* (2013.01); *F24H 1/121* (2013.01); *H05B 1/0252* (2013.01); *H05B 1/0269* (2013.01); *H05B 3/58* (2013.01); *H05B 6/645* (2013.01)

(56) References Cited

U.S. PATENT DOCUMENTS

| | | | |
|---|---|---|---|
| 6,035,471 A | 3/2000 | Lahrmann et al. | |
| 6,236,321 B1* | 5/2001 | Troost, IV | F24H 9/0042 126/116 A |
| 6,924,499 B2 | 8/2005 | Poisel et al. | |
| 7,162,896 B2 | 1/2007 | Eiermann et al. | |
| 7,730,568 B2 | 6/2010 | Wong et al. | |
| 7,861,343 B2 | 1/2011 | Herkle et al. | |
| 7,966,683 B2 | 6/2011 | Herkle et al. | |
| 8,037,565 B2 | 10/2011 | Herkle et al. | |
| 2003/0202787 A1 | 10/2003 | Wu | |
| 2008/0317091 A1* | 12/2008 | Siddons | A47J 27/21091 374/102 |
| 2008/0317447 A1* | 12/2008 | Lentz | F22B 1/284 392/326 |
| 2009/0056762 A1* | 3/2009 | Pinkowski | D06F 39/008 134/22.15 |
| 2011/0114126 A1 | 5/2011 | Jerg et al. | |

FOREIGN PATENT DOCUMENTS

| | | |
|---|---|---|
| EP | 0966914 B1 | 12/1999 |
| EP | 2031113 A1 | 3/2009 |
| EP | 2208819 B1 | 8/2011 |
| EP | 2478816 A2 | 7/2012 |
| FR | 2462893 A1 | 2/1981 |
| JP | 60135749 | 7/1985 |
| WO | 2008/099322 A2 | 8/2008 |
| WO | 2008/099322 A3 | 8/2008 |

OTHER PUBLICATIONS

EP 2478816A2, Lutz et al, "Domestic Dishwasher has Temperature Sensors," Jul. 25, 2012, partial translation.*
European Search Report for Corresponding EP14168378.9, Nov. 6, 2014.

* cited by examiner

METHODS, APPARATUS AND ARTICLES OF MANUFACTURES TO DETECT IMPURITY DEPOSITS IN FLOW-THROUGH WATER HEATERS

RELATED APPLICATION(S)

This application claims the priority benefit of U.S. Provisional Patent Application No. 61/834,907, filed on Jun. 14, 2013, the entirety of which is incorporated herein by reference.

FIELD OF THE DISCLOSURE

This disclosure relates generally to flow-through water heaters, and, more particularly, to methods, apparatus and articles of manufacture to detect impurities in flow-through water heaters.

DETAILED DESCRIPTION

Figure 1:
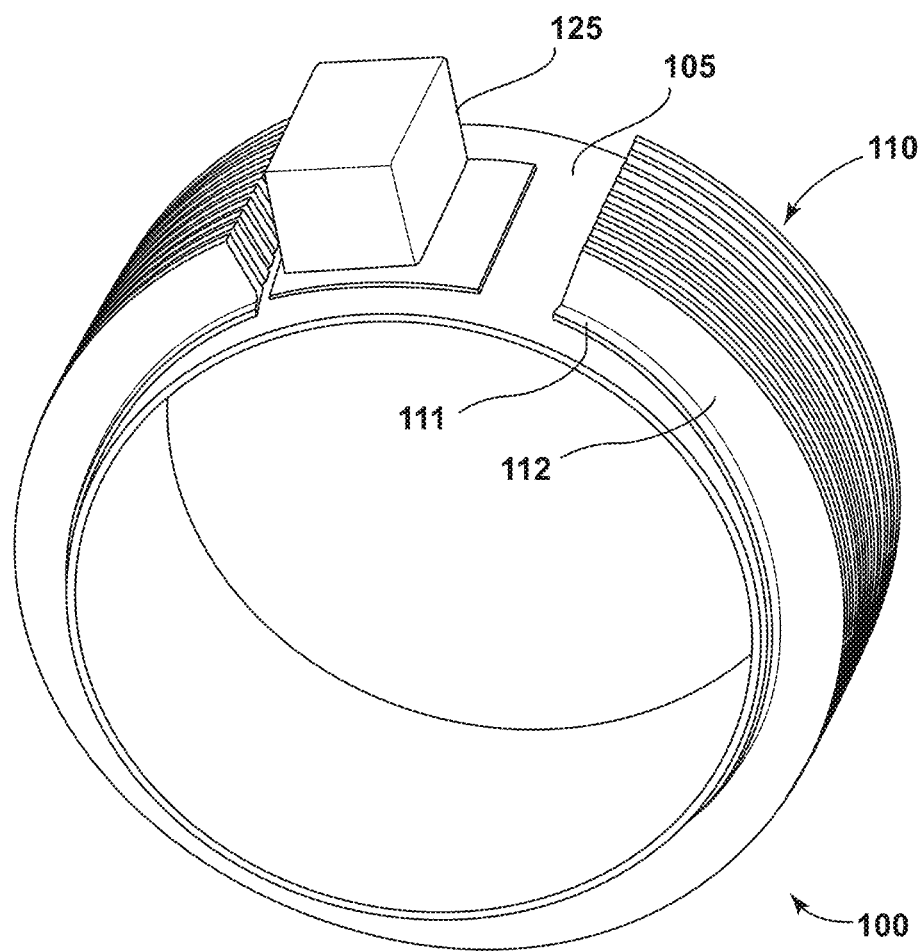
FIG. 1 is an isometric cross-sectional view of an example flow-through water heater.

A thick film, flow-through water heater can be used to heat water during, for example, the wash cycle of a home appliance such as, but not limited to, a washing machine, a dishwasher, a refresher, etc. An example flow-through water heater includes a stainless steel tube with a heater trace (e.g., thick film) "printed" or otherwise applied to the outside of the tube. The heater trace heats up the stainless steel tube and, thus, the water passing through the flow-through heater.

When the water is drained, a built in check valve may not completely prevent the back flow of water. Thus, there may be a small amount of water that could remain in the flow-through water heater. When the heating element is used to heat air (e.g., during a steaming or drying cycle), any residual water sitting in the flow-through water heater will evaporate inside the chamber. The phase change during the steaming of that water can precipitate calcium and start the buildup of impurity deposits in the flow-through water heater. Calcium deposits can also be the results of normal water heating. The calcium deposits will serve as a thermal insulator that reduces the thermal efficiency of the flow-through water heater causing, for example, a reduction in heat transfer from the heater to the water. As result, the flow-through water heater has to work at a higher surface temperature on the outside wall and/or for a longer time to reach target water temperatures to compensate for the lower efficiency. However, the increased surface temperature and elongated heating time can result in the radiation of more heat to a heater enclosure and/or external components that could result in increased energy consumption.

Some prior-art appliances rely on higher temperature rated materials, increased air gaps, additional thermal insulation, etc. to reduce the radiation of heat to surrounding components. Any additional energy consumption is normally attributed to normal wear of the appliance.

To overcome at least the above problems, apparatus and methods to detect the buildup of impurity deposits in a flow-through water heater are disclosed. Calcium deposits typically start to build where phase changes happen (e.g., during steaming), which typically is the lower half of the heating chamber. During normal water heating, when the chamber is completely full of water, the high surface temperature of the chamber and gravity typically cause suspended calcium to build on the bottom half of the chamber. As calcium continues to stick to the bottom half it creates a thickening layer between the water and the heated chamber. As a result, the heater track located on the outside of the chamber cannot transfer all of the heat to the water, which results in a higher surface temperature on the outside of the chamber (e.g., a hot spot). As disclosed herein, to detect this condition a temperature sensor (e.g., a thermistor) is placed on the bottom half of the chamber. A second thermistor is placed on top half of the chamber. The temperature at both locations, together with the water temperature are monitored and compared to determine the operating condition(s) of the flow-through water heater. When a meaningful temperature difference is detected, action can be taken to either modify the cycle, or notify the consumer to get the machine serviced or start a cleaning cycle. Thus, by detecting impurity deposits, the energy efficiency of an appliance can be retained overtime.

In an embodiment, a flow-through water heater including a conduit to conduct a fluid flowing therethrough additionally includes first and second temperature measuring elements to determine respective first and second temperatures at different locations on the conduit. A computing unit detects an impurity deposit in the conduit based on a first difference between the first and second temperatures. In some examples, the first temperature measuring element is positioned at substantially a top of the conduit, and the second temperature measuring element is positioned at substantially a bottom of the conduit.

Based on at least the above, it should be readily apparent that this disclosure enables impurity deposits in flow-through water heaters to be readily detected. In any case, additional objects, features and advantages of this disclosure will become more readily apparent from the following detailed description of embodiments when taken in conjunction with the drawings wherein like reference numerals referring to corresponding parts in the several views.

Figure 2:
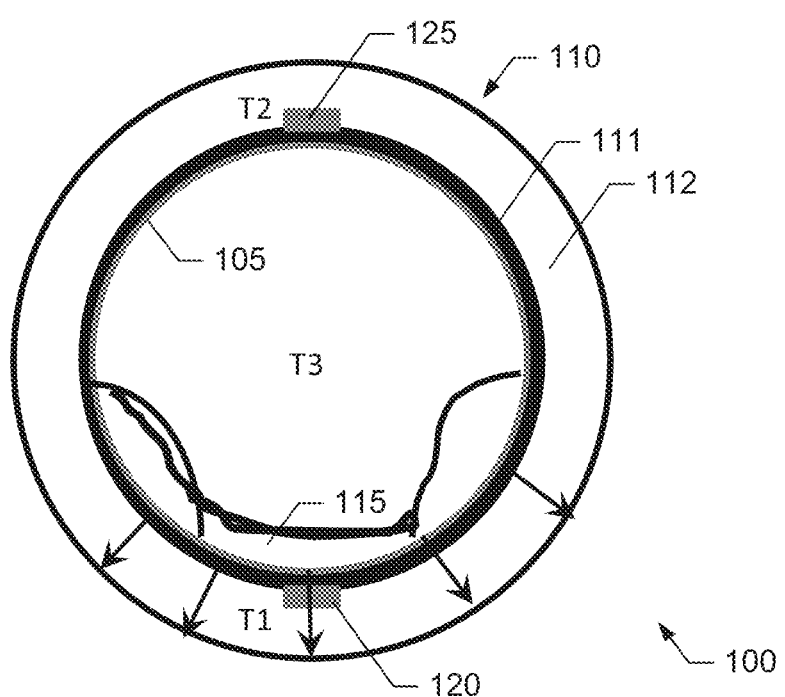
FIG. 2 is a schematic cross-sectional view of the example flow-through water heater of FIG. 1.

FIGS. 1 and 2 illustrate an example flow-through water heater 100 that may be used to heat water for use by, for example, any number and/or type(s) of home appliances. Example home appliances include, but are not limited to, laundry treating appliances (e.g., a horizontal or a vertical axis clothes washer, a dryer, a combination washing machine and dryer, a tumbling or stationary refreshing/revitalizing machine, an extractor, a non-aqueous washing apparatus, and a revitalizing machine), a dishwasher, a refrigerator, a coffee maker, a hot water dispenser, an electric teapot, a microwave, a stove, etc. While the example of FIGS. 1 and 2 is a water heater, it should be understood that the methods and apparatus disclosed herein may be used to detect impurity deposits in other flow-through heaters used to heat other types of fluids.

The flow-through water heater 100 of FIGS. 1 and 2 includes a chamber, pipe or tube 105 through which water to be heated flows. As the water passes through the chamber, pipe or tube 105, heat is transferred from a heating element 110 to the water through the chamber, pipe or tube 105. In some examples, the heating element 110 of FIGS. 1 and 2 includes a thick-film heat generator 111 having a first side that is wrapped around, encircles, extends around, surrounds and/or is affixed to at least a portion of the chamber, pipe or tube 105, and a second side that is affixed or coupled to a heat radiating element such as a heat sink 112. Other types of heating elements 110, with or without a heat radiating element, may be used. Moreover, the heating element 110 may only apply heat to a portion (e.g., the bottom) of the chamber, pipe or tube 105

As shown in FIG. 2, over time calcium, magnesium, other minerals, sludge or any other number and/or type(s) of impurities 115 found in the water can become deposited on interior surfaces of the chamber, pipe or tube 105. Such impurities 115 can reduce the heating efficiency of the heater 100, may lead to an unsafe operating condition such as overheating, or may cause undesirable amounts of heat to be radiated outward from the heater 100 into a cavity surrounding the water heater 100. Therefore, disclosed herein are methods and apparatus that can detect the deposit of the impurities 115 within the flow-through water heater 100.

To measure the surface temperature of the chamber, pipe or tube 105, the example flow-through water heater 100 of FIGS. 1 and 2 include thermisters or thermocouplers 120 and 125, located on opposite sides of the chamber, pipe or tube 105. Preferably, one thermister 125 is located on the top of the chamber, pipe or tube 105, and the other thermister 120 is located on the bottom of the chamber, pipe or tube 105. The methods and apparatus disclosed herein use differences between temperatures T1 and T2, respectively measured by the thermisters 120 and 125, and the temperature T3 of the water passing through the water heater 100 to detect the impurities 115. For example, an increase in the absolute value of the difference |T1-T2| is indicative of the impurities 115 in the water heater 100. Moreover, there may be a difference |T1-T2| that occurs even when the impurities 115 are not present and, thus, an increase in that difference |T1-T2| is indicative of the impurities 115.

FIGS. 3-6 are flowcharts representative of example methods that may be used to detect the deposit of the impurities 115 within the flow-through water heater 100. A processor, a controller and/or any other suitable computing unit such as the controller P100 of FIG. 7 may be used, configured and/or programmed to execute and/or carry out the example methods of FIGS. 3-6. For example, the methods of FIGS. 3-6 may be embodied in program code and/or machine-readable instructions stored on a tangible computer-readable medium such as memory P115 (see FIG. 7). Many other methods of implementing the methods of FIGS. 3-6 may be employed. For example, the order of execution may be changed, and/or one or more of the blocks and/or interactions described may be changed, eliminated, sub-divided, or combined. Additionally, any or all of the methods of FIGS. 3-6 may be carried out sequentially and/or carried out in parallel by, for example, separate processing threads, processors, devices, discrete logic, circuits, etc.

As used herein, the term "tangible computer-readable medium" is expressly defined to include any type of computer-readable medium and to expressly exclude propagating signals. As used herein, the term "non-transitory computer-readable medium" is expressly defined to include any type of computer-readable medium and to exclude propagating signals. Example tangible and/or non-transitory computer-readable medium include a volatile and/or non-volatile memory, a volatile and/or non-volatile memory device, a compact disc (CD), a digital versatile disc (DVD), a flash memory, a read-only memory (ROM), a random-access memory (RAM), a programmable ROM (PROM), an electronically-programmable ROM (EPROM), and/or an electronically-erasable PROM (EEPROM).

Figure 3:
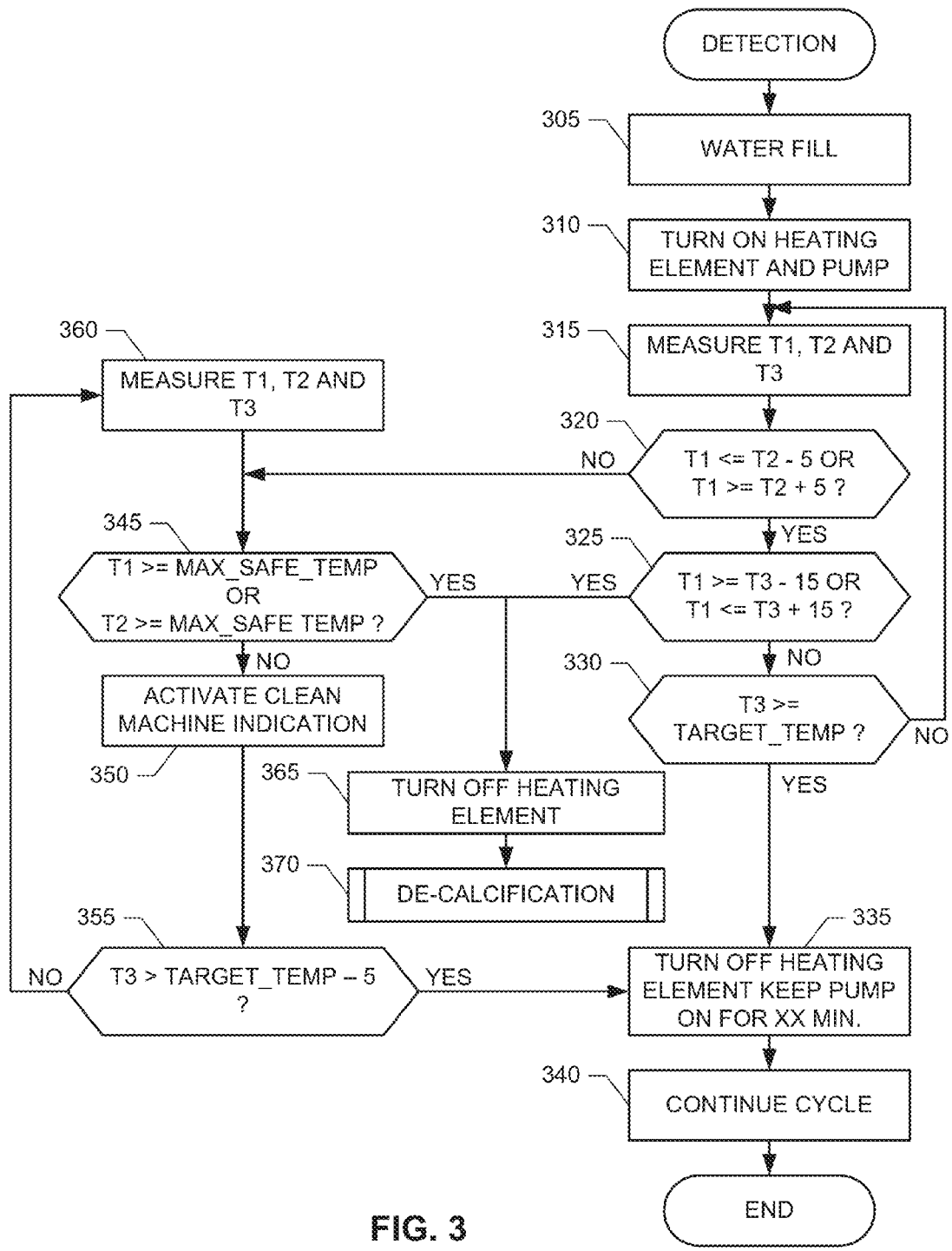
FIGS. 3-6 are flow charts illustrating example methods of detecting impurities in the flow-through water heaters of FIGS. 1 and 2.

The example method of FIG. 3 begins with the water heater 100 being filled with water (block 305), and turning on the heating element 110 and a pump (block 310). The temperatures T1, T2 and T3 are measured (block 315).

If T1 is inside the range (T2−5, T2+5) indicating deposits are unlikely (block 320) and if T1 is inside the range (T3−15, T3+15) (block 325), then T3 is compared to its target temperature TARGET_TEMP (block 330). In the example of FIG. 3, the constants 5 and 15 are used as exemplary values, however other values may be used. For example, if an initial difference |T1-T2| is non-zero for a new/clean water heater 100, then the constant value 5 may be increased to accommodate the initial difference |T1-T2|. If T3 has not yet reached its target temperature (block 330), control returns to block 315 to measure T1, T2 and T3. If T3 has reaches its target temperature (block 330), the heating element is turned off while the pump continues to run (block 335) and the remainder of the appliance operation cycle is continued (block 340). The length of time that the pump continues to run may depend on, for example, heater power, power density in the spot where impurities may form, geometry of the heating chamber, material of the heating chamber, how the sensing devices are mounted, etc.

Returning to block 325, if T1 is outside the range (T3−15, T3+15) (block 325), then T1 1 and T2 are compared to a maximum safe operating temperature MAX_SAFE_TEMP (block 345). If T1 and T2 are within safe operating limits (block 345), then a "clean machine" indicator is activated (block 350), and T3 is compared to the target temperature for T3 TARGET_TEMP decreased by 5 degrees (block 355). If T3 satisfies the decreased target temperature (block 355), then control proceeds to block 335. Otherwise, control proceeds to block 360 to measure T1, T2 and T3. The "clean machine" indicator may be, for example, an LED illuminated on a control panel, or a message or error code displayed on a screen of a control panel.

Returning to block 345, if T1 and T2 are not within safe operating limits (block 345), then the heating element 110 is turned off (block 365), a de-calcification process is initiated (block 370), and control exits from the example method of FIG. 3. Example de-calcification methods are shown in FIGS. 4-6.

Returning to block 320, if T1 is outside the range (T2−5, T2+5) (block 320) indicating that deposits are likely, then control proceeds to block 345 to monitor for safe operating conditions.

Figure 4:
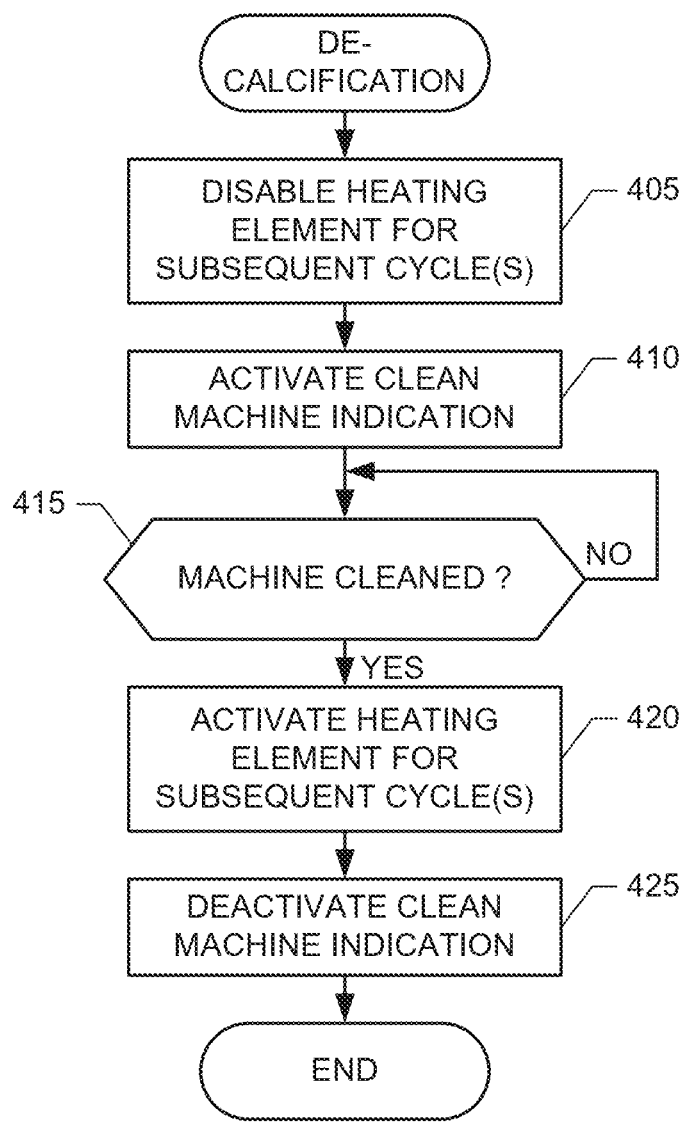

FIG. 4 is a flowchart representative of an example method that may be used to remove the impurities 115 from (e.g., de-calcify) the flow-through water heater 100. The example method of FIG. 4 begins with the heater 110 being disabled for subsequent appliance operation cycles (block 405), and activating a "clean machine" indicator (block 410). When the machine has been cleaned by, for example, the owner, a user, or a service technician (block 415), the heating element 110 is enabled for subsequent appliance operation cycles (block 420) and the "clean machine" indicator is extinguished (block 425). Control then exits from the method of FIG. 4.

Figure 5:
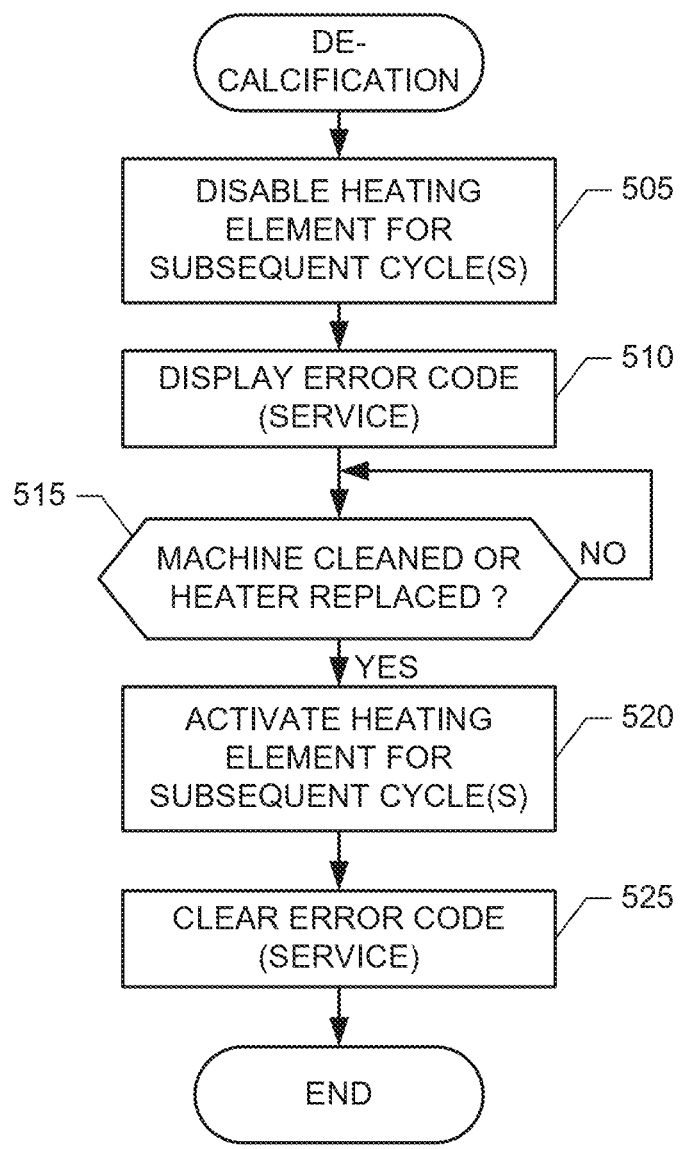
Figure 6:
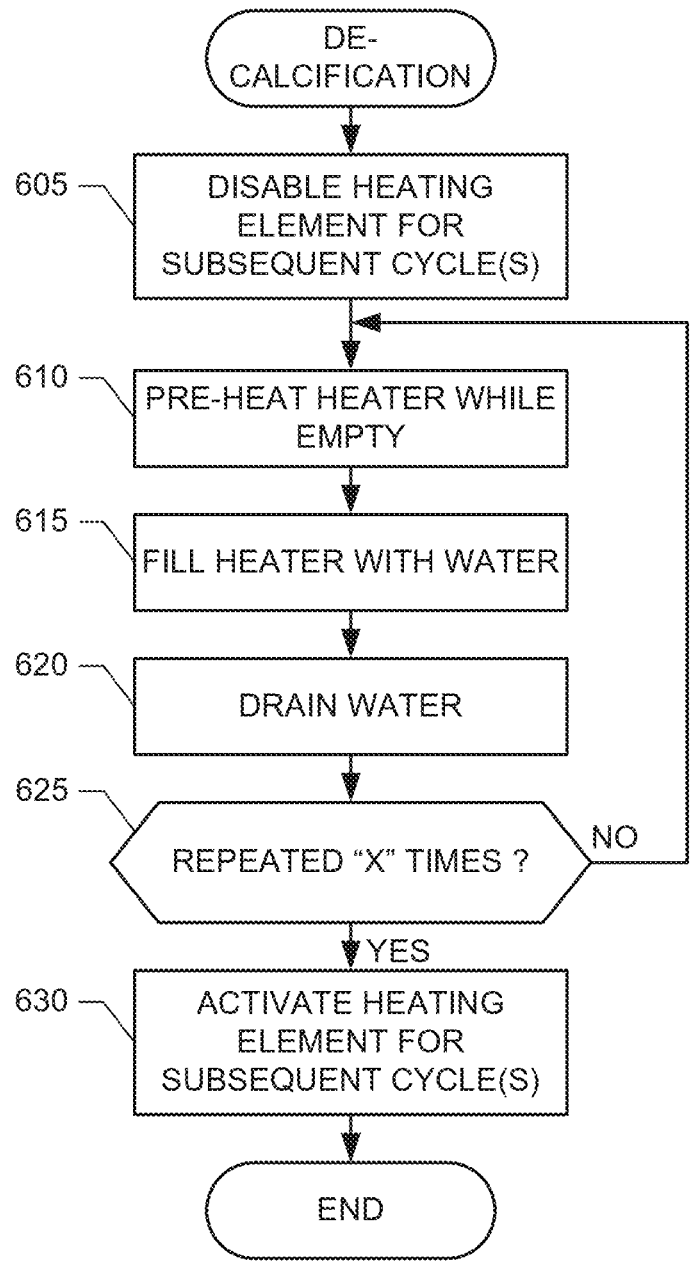

FIG. 5 is a flowchart representative of another example method that may be used to remove the impurities 115 from (e.g., de-calcify) the flow-through water heater 100. The example method of FIG. 5 begins with the heater 110 being disabled for subsequent appliance operation cycles (block 505), and displaying an error code (block 510). When the machine has been cleaned by, for example, the owner, a user, or a service technician (block 515), the heating element 110 is enabled for subsequent appliance operation cycles (block 520) and the error code is extinguished (block 525). Control then exits from the method of FIG. 5.

FIG. 6 is a flowchart representative of yet another example method that may be used to remove the impurities 115 from (e.g., de-calcify) the flow-through water heater 100. The example method of FIG. 6 begins with the heater 110 being disabled for subsequent appliance operation cycles (block 605). The heater 110 is pre-heated while empty (block 610), then water is introduced into the pre-heated heater 110 (block 615) and then the water is drained (block 620). By repeatedly (block 625) pre-heating, introducing water and draining the water, the impurities 115 can be loosened and removed. The number of times that pre-heating, introducing water, and draining the water are repeated may depend on, for example, heater power, power density in the spot where impurities may form, geometry of the heating chamber, material of the heating chamber, how the sensing devices are mounted, etc. Once the impurities 115 have been removed (block 625), the heating element 110 is enabled for subsequent appliance operation cycles (block 630). Control then exits from the method of FIG. 5.

Figure 7:
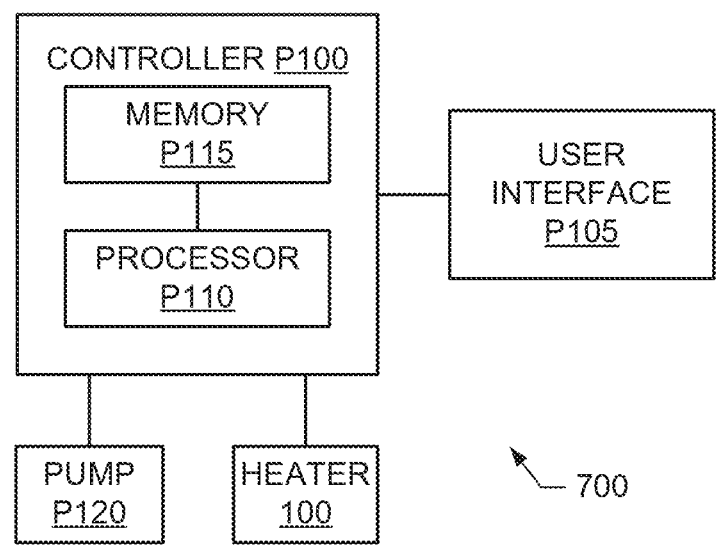
FIG. 7 is a schematic view of an example control system that may be used to detect impurities in the flow-through water heaters of FIGS. 1 and 2.

FIG. 7 is a schematic diagram of an example control system 700 that may be implemented as part of an appliance and be used, configured and/or programmed to execute and/or carry out the example methods of FIGS. 3-6 and/or one or more cycles of operation. The control system 700 may include a computing unit P100 (e.g., a controller, a processor, etc.) and a user interface P105 that is operably coupled with the computing unit P100. The user interface P105 may include one or more knobs, dials, switches, displays, touch screens and the like for communicating with the user, such as to receive input and provide output. The user may enter different types of information including, without limitation, cycle selection and cycle parameters, such as cycle options.

The computing unit P100 may, for example, include one or more controllers or processors P110 for controlling components of an appliance. For example, the computing unit P100 may include and/or implement a machine controller and a motor controller. Many known types of controllers or processors may be used. The specific type of controller(s) and processor(s) is not germane to this disclosure. It is contemplated that the computing unit P100 is a microprocessor-based controller that implements control software and sends/receives one or more electrical signals to/from each of the various working components to affect control software.

As illustrated in FIG. 7, the computing unit P100 may be provided with a memory P115. The memory P115 may be used for storing the control software that is executed by the processors and/or controllers P110 in completing a cycle of operation and/or the example methods of FIGS. 3-6.

The computing unit P100 may be operably coupled with one or more components of an appliance for communicating with and controlling the operation of the component to complete a cycle of operation. For example, the computing unit P100 may be operably coupled with a pump P120 and the water heater 100.

The controller or processor P110 may also be coupled with one or more sensors (not shown) provided in one or more of the systems of an appliance to receive input from the sensors, which are known in the art and not shown for simplicity.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
a flow-through water heater including:
a conduit to conduct a fluid flowing therethrough;
a heating element extending around at least a portion of the conduit; and
first and second temperature measuring elements to determine respective first and second temperatures at different locations on the conduit; and
a computing unit to at least detect an impurity deposit in the conduit based on a first difference between the first and second temperatures.

2. An apparatus according to claim 1, wherein the first temperature measuring element is positioned at substantially a top of the conduit, and the second temperature measuring element is positioned at substantially a bottom of the conduit.

3. An apparatus as defined in claim 1, further comprising a third temperature measuring element to determine a third temperature at a third location on the conduit, wherein the computing unit is to detect the impurity deposit based additionally on a second difference between the first and third temperatures.

4. An apparatus as defined in claim 3, wherein the computing unit is to detect the impurity deposit by at least:
comparing the first difference to a first threshold;
comparing the second difference to a second threshold; and
detecting the impurity deposit when the first and second thresholds are satisfied.

5. An apparatus as defined in claim 1, wherein the computing unit is to detect the impurity deposit by at least:
comparing the first difference to a first threshold;
comparing at least one of the first and/or the second temperature to a second threshold; and
detecting the impurity deposit when the first threshold is not satisfied and the second threshold is satisfied.

6. An apparatus as defined in claim 1, further comprising a user interface to display at least one of a clean machine indication, an error code and/or error indication when the impurity deposit is detected.

7. An apparatus as defined in claim 1, wherein the computing unit is to additionally disable the heating element when the impurity deposit is detected.

8. An apparatus as defined in claim 7, wherein the computing unit is to additionally enable the heating element after at least one of a cleaning cycle has completed, and/or the conduit has been cleaned.

9. An apparatus as defined in claim 1, wherein the first and second temperature measuring elements determine respective first and second surface temperatures of the conduit.

10. An apparatus as defined in claim 1, wherein the first and second temperature measuring elements are located on an outside of the conduit.

11. A method of detecting an impurity deposit in a flow-through water heater having a conduit to conduct a fluid flowing therethrough, and a heating element in contract with at least a portion of the conduit, the method comprising:
measuring first and second temperatures at different locations on the conduit; and detecting the impurity deposit based on a difference between the first and second temperatures.

12. An apparatus according to claim 11, wherein measuring first and second temperatures comprises:
   measuring the first temperature using a first temperature measuring element positioned at substantially a top of the conduit; and
   measuring the second temperature using a second temperature measuring element positioned at substantially a bottom of the conduit.

13. A method as defined in claim 11, further comprising determining a third temperature at a third location on the conduit, wherein detecting the impurity deposit is additionally based on a second difference between the first and third temperatures.

14. A method as defined in claim 13, wherein detecting the impurity comprises:
   comparing the first difference to a first threshold;
   comparing the second difference to a second threshold; and
   detecting the impurity deposit when the first and second thresholds are satisfied.

15. A method as defined in claim 11, further comprising displaying on a user interface at least one of a clean machine indication, an error code and/or error indication when the impurity deposit is detected.

16. A method as defined in claim 11, wherein detecting the impurity comprises:
   comparing the first difference to a first threshold;
   comparing at least one of the first and/or the second temperature to a second threshold; and
   detecting the impurity deposit when the first threshold is not satisfied and the second threshold is satisfied.

17. A method as defined in claim 11, further comprising disabling the heating element when the impurity deposit is detected.

18. A method as defined in claim 17, further comprising enabling the heating element after at least one of cleaning cycle has completed, and/or the conduit has been cleaned.

19. A method as defined in claim 11, wherein measuring the first and second temperatures includes measuring first and second temperatures of the conduit.

20. A method as defined in claim 11, wherein measuring the first and second temperatures includes measuring first and second temperatures on an outside of the conduit.

* * * * *